United States Patent
Yamamoto et al.

(10) Patent No.: US 9,030,130 B2
(45) Date of Patent: May 12, 2015

(54) HIGH-PRESSURE DISCHARGE LAMP LIGHTING DEVICE, HIGH-PRESSURE DISCHARGE LAMP DEVICE USING THE SAME, PROJECTOR USING THE HIGH-PRESSURE DISCHARGE LAMP DEVICE, AND LIGHTING METHOD FOR HIGH-PRESSURE DISCHARGE LAMP

(75) Inventors: Masahiro Yamamoto, Osaka (JP); Syunsuke Ono, Osaka (JP)

(73) Assignee: Panasonic Corporation, Osaka (JP)

( * ) Notice: Subject to any disclaimer, the term of this patent is extended or adjusted under 35 U.S.C. 154(b) by 309 days.

(21) Appl. No.: 13/202,539

(22) PCT Filed: Jan. 17, 2011

(86) PCT No.: PCT/JP2011/000194
§ 371 (c)(1),
(2), (4) Date: Aug. 19, 2011

(87) PCT Pub. No.: WO2011/138846
PCT Pub. Date: Nov. 10, 2011

(65) Prior Publication Data
US 2012/0049764 A1    Mar. 1, 2012

(30) Foreign Application Priority Data
May 6, 2010   (JP) ................................ 2010-106782

(51) Int. Cl.
*H05B 37/02*      (2006.01)
*H05B 41/288*     (2006.01)
*H05B 41/38*      (2006.01)

(52) U.S. Cl.
CPC .......... *H05B 41/2882* (2013.01); *H05B 41/388* (2013.01); *Y02B 20/204* (2013.01)

(58) Field of Classification Search
CPC ..... H05B 31/0081; H05B 41/38; H05B 37/02
USPC ......................................... 315/291, 360, 308
See application file for complete search history.

(56) References Cited

U.S. PATENT DOCUMENTS 6,153,987 A * 11/2000 Toda et al. .................... 315/308
7,667,413 B2 * 2/2010 Ikeda et al. ................... 315/293

(Continued)

FOREIGN PATENT DOCUMENTS

| | | |
|---|---|---|
| JP | 2004-207018 | 7/2004 |
| JP | 2009-054309 | 3/2009 |

(Continued)

OTHER PUBLICATIONS

Chinese Application No. 201180001682.2 Office Action dated Jun. 26, 2013, 6 pages.

*Primary Examiner* — Thuy Vinh Tran

(57) ABSTRACT

From a start of a lighting until a predetermined time period passes, a high-pressure discharge lamp is supplied with a constant current (Ib) until the lamp power reaches a predetermined wattage ($P_{low}$). When the lamp power reaches the wattage ($P_{low}$), current is supplied to maintain the lamp power at the wattage ($P_{low}$). After another predetermined time period passes, current is supplied to maintain the lamp power at a rated lamp wattage (Pr). While this lamp power is being maintained, the size of the lamp current is limited to a current limit (Ia). The current (Ib) and the wattage ($P_{low}$) satisfy a relationship Ia·0.7≤Ib≤Ia·0.9 and Pr·0.5 $P_{low}$≤Pr·0.9 to accelerate an initial building of luminous flux while reducing drainage to the electrodes.

3 Claims, 13 Drawing Sheets

(56) References Cited

U.S. PATENT DOCUMENTS

| | | | |
|---|---|---|---|
| 7,688,003 B2* | 3/2010 | Yamada et al. | 315/291 |
| 8,310,174 B2* | 11/2012 | Ikeda | 315/291 |
| 2003/0201735 A1* | 10/2003 | Yamamoto et al. | 315/291 |
| 2004/0136134 A1 | 7/2004 | Okawa et al. | |
| 2007/0164687 A1* | 7/2007 | Watanabe et al. | 315/291 |
| 2010/0177286 A1 | 7/2010 | Ikeda | |

FOREIGN PATENT DOCUMENTS

| | | |
|---|---|---|
| JP | 2009-059602 | 3/2009 |
| WO | 2009/028213 | 3/2009 |

* cited by examiner

FIG. 6

|  | Current Ib | Wattage P_low | Buildup |
|---|---|---|---|
| Example 1 | 3.6 A | 180 W | Good |
| Example 2 | 3.6 A | 160 W | Good |
| Example 3 | 3.2 A | 140 W | Good |
| Example 4 | 2.8 A | 120 W | Good |
| Example 5 | 2.8 A | 100 W | Good |
| Comparative Example 1 | 4.0 A | — | Good |
| Comparative Example 2 | 1.78 A | 160 W | — |

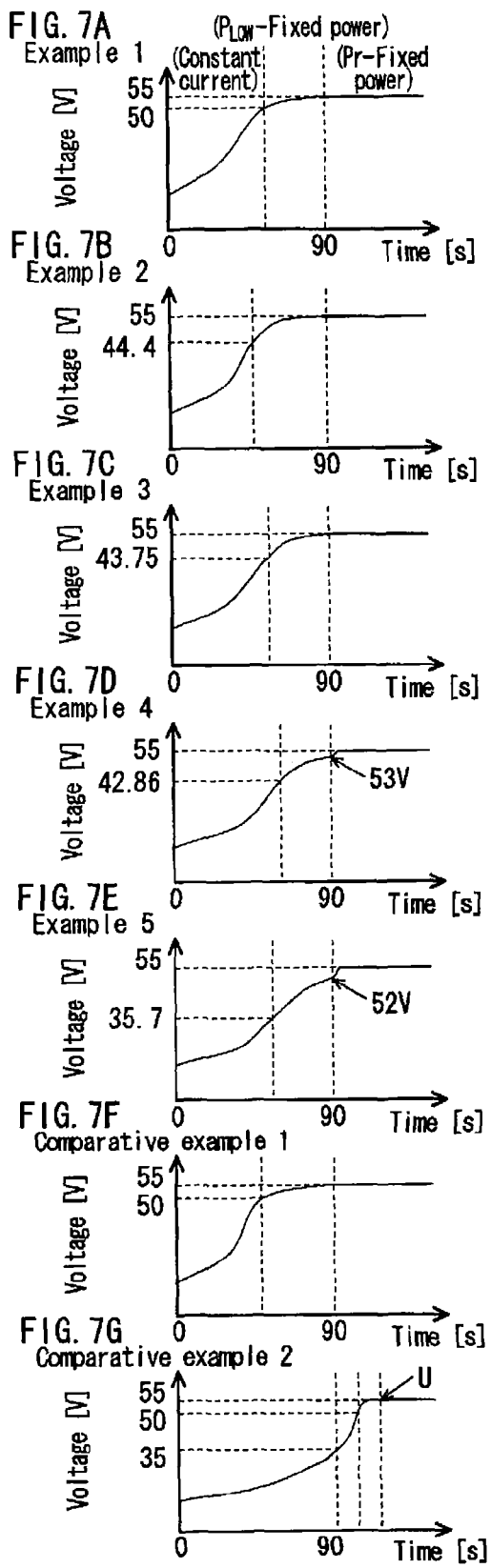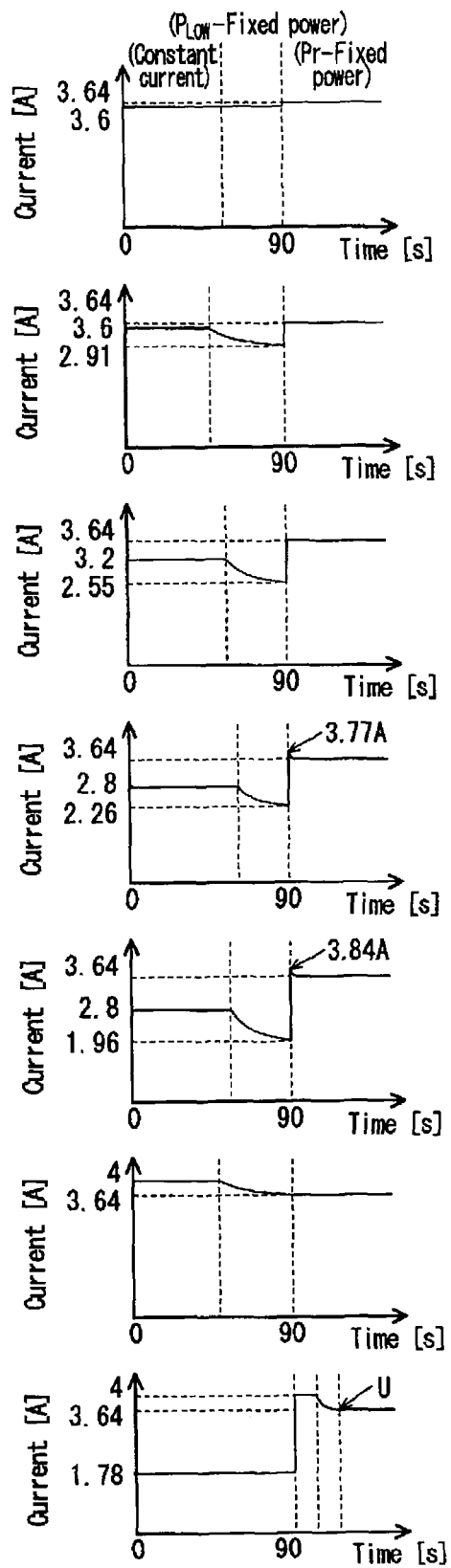

FIG. 8A

|  |  | Cumulative lighting duration | |
|---|---|---|---|
|  |  | 0 (h) | 1050 (h) |
| Lamp voltage | Example 1 | 55 V | 75 V |
|  | Example 2 | 55 V | 70 V |
|  | Example 3 | 55 V | 60 V |
|  | Example 4 | 55 V | 70 V |
|  | Example 5 | 55 V | 75 V |
|  | Comparative example 1 | 55 V | 95 V |
|  | Comparative example 2 | 55 V | 85 V |

FIG. 8B

|  |  | Cumulative lighting duration | | Lamp lifetime (predicted) | Lifetime evaluation |
|---|---|---|---|---|---|
|  |  | 0 (h) | 1050 (h) |  |  |
| Fraction of illumination maintained | Example 1 | 100% | 75% | 2100 h | Good |
|  | Example 2 | 100% | 80% | 2600 h | Good |
|  | Example 3 | 100% | 90% | 5000 h | Excellent |
|  | Example 4 | 100% | 80% | 2600 h | Good |
|  | Example 5 | 100% | 75% | 2100 h | Good |
|  | Comparative example 1 | 100% | 60% | 1300 h | Poor |
|  | Comparative example 2 | 100% | 65% | 1500 h | Poor |

HIGH-PRESSURE DISCHARGE LAMP LIGHTING DEVICE, HIGH-PRESSURE DISCHARGE LAMP DEVICE USING THE SAME, PROJECTOR USING THE HIGH-PRESSURE DISCHARGE LAMP DEVICE, AND LIGHTING METHOD FOR HIGH-PRESSURE DISCHARGE LAMP

RELATED APPLICATIONS

The present application claims priority from PCT/JP2011/000194 filed on Jan. 17, 2011. PCT/JP2011/000194 claims foreign priority benefits from the Japanese Application No. 2010-106782 filed on May 6, 2010.

TECHNICAL FIELD

The present invention relates to a high-pressure discharge lamp lighting device, a high-pressure discharge lamp device using the same, a projector using the high-pressure discharge lamp device, and a lighting method for a high-pressure discharge lamp.

BACKGROUND ART

As a light source, projectors often use a high-pressure discharge lamp, which provides nearly point-source light. In particular, use of high-pressure mercury lamps is common. A high-pressure mercury lamp includes an arc tube containing mercury as a light-emitting material, as well as a pair of tungsten electrodes disposed substantially opposite each other. The high-pressure mercury lamp emits light by producing arc discharge between the electrodes.

Widely-used, conventional lighting devices for such a high-pressure mercury lamp light the lamp by providing a constant current Ic until a predetermined time passes after the start of lighting, for example until reaching a rated lamp wattage Pr. After the predetermined time passes, the lamp power is constant at the rated lamp wattage Pr. During constant power supply, if the lamp voltage drops too low, the lamp current may become too large, damaging the electronic components in the device. Therefore, the lamp current is limited to be equal to or less than a predetermined value (hereinafter referred to as the current limit Ia). Furthermore, the current Ic is normally set to the value of the current limit Ia.

In the above-described conventional lighting device for a high-pressure mercury lamp, when the constant current supply at the current Ic switches to constant power supply at the rated lamp wattage Pr, the provided power and current are both large (rated lamp wattage Pr, current Ic). In particular, it is known that at this time, the temperature of the pair of electrodes rises notably, causing damage to the electrodes.

To reduce such damage to the electrodes, one proposed lighting device for a high-pressure mercury lamp provides a constant current Id that is smaller than the conventional current Ic from the start of lighting until a predetermined time has passed, thus reducing the current as compared to a conventional configuration when switching to constant power supply at the rated lamp wattage Pr (see Patent Literature 1).

In the lighting device of Patent Literature 1, the current Id is set using the rated lamp wattage Pr and the upper limit $V_{high}$ of the tolerance in the rated lamp voltage that is specified taking into account variation upon manufacturing of the high-pressure mercury lamp (Id<Pr/$V_{high}$). On the other hand, the current Ic in the above conventional lighting device is the same size as the current limit Ia. The current limit Ia is generally set using the rated lamp wattage Pr and the lower limit $V_{low}$ of the tolerance (Ia=Pr/$V_{low}$). Accordingly, the current Id becomes smaller than the current limit Ia and the current Ic. Since the current decreases, the increase in temperature of the pair of electrodes is correspondingly moderated as compared to the above conventional lighting device, which is considered to reduce damage to the electrodes.

In the graphs in FIGS. 14A-14C, the lamp power, lamp voltage, and lamp current over time when a lamp is lit by the lighting device recited in Patent Literature 1 are shown as solid lines. The relationships when a lamp is lit by the above conventional lighting device are shown as lines with alternate long and two short dashes. The rated lamp wattage of the high-pressure mercury lamp in these graphs is 250 W, the rated lamp voltage is 80 V, and the tolerance of the rated lamp voltage is 62.5 V to 95 V.

As shown in FIGS. 14A-14C, with the lighting device recited in Patent Literature 1, a current Id (2.5 A) that is lower than the current Ic (4 A) in the above conventional lighting device is provided from the start of lighting until the lamp voltage reaches 80 V. The current when switching to the constant power supply at the rated lamp wattage of 250 W is 3.125 A, a smaller value than the current Ic.

CITATION LIST

Patent Literature

Patent Literature 1: Japanese Patent Application Publication No. 2009-59602

SUMMARY OF INVENTION

Technical Problem

The lighting device recited in Patent Literature 1, however, has the problem that the current Id becomes too low as compared to the current limit Ia, causing a delay in the buildup of luminous flux in the high-pressure mercury lamp as compared to the above conventional lighting device; in the example in FIGS. 14A-14C, the current Id is 62.5% of the current limit Ia (=2.5 A/4 A).

In light of this problem, it is an object of the present invention to provide a high-pressure discharge lamp lighting device, a high-pressure discharge lamp device using the same, a projector using the high-pressure discharge lamp device, and a lighting method for a high-pressure discharge lamp that, compared to a conventional structure, reduce damage to the pair of electrodes in the high-pressure discharge lamp while moderating a delay in the buildup of luminous flux in the lamp.

Solution to Problem

A high-pressure discharge lamp lighting device according to the present invention is for lighting a high-pressure discharge lamp having an arc tube enclosing a light-emitting material and a pair of electrodes disposed opposite each other, the high-pressure discharge lamp lighting device comprising: a power supply unit operable to supply power to the high-pressure discharge lamp; and a control unit operable to control the power supply unit by selectively performing (i) constant power control to cause the power supply unit to maintain lamp power at a constant power at which lamp current is equal to or less than a current limit Ia and (ii) constant current control to cause the power supply unit to maintain the lamp current at a constant current, wherein the control unit performs, until a predetermined time passes after lighting of the high-pressure discharge lamp starts, at least (i) constant current control to cause the power supply unit to maintain the lamp current at a predetermined current Ib smaller than the current limit Ia and (ii) a first constant power control to cause the power supply unit to maintain the lamp power at a predetermined wattage $P_{low}$ lower than a rated lamp wattage Pr starting when the lamp power reaches the wattage $P_{low}$, during the constant current control, and performs, after the predetermined time passes, a second constant power control to cause the power supply unit to maintain the lamp power at the rated lamp wattage Pr, and the current Ib and the wattage $P_{low}$ satisfy the relationships:

$Ia \cdot 0.7 \leq Ib \leq Ia \cdot 0.9$ and $Pr \cdot 0.5 \leq P_{low} \leq Pr \cdot 0.9$.

A high-pressure discharge lamp device according to the present invention comprises: a high-pressure discharge lamp having an arc tube enclosing a light-emitting material and a pair of electrodes disposed opposite each other; and the above high-pressure discharge lamp lighting device for lighting the high-pressure discharge lamp.

A projector according to the present invention comprises the above high-pressure discharge lamp device.

A method according to the present invention is for lighting a high-pressure discharge lamp having an arc tube enclosing a light-emitting material and a pair of electrodes disposed opposite each other, the method being used in a lighting device provided with a power supply unit operable to supply power to the high-pressure discharge lamp and a control unit operable to control the power supply unit by selectively performing (i) constant power control to cause the power supply unit to maintain lamp power at a constant power at which lamp current is equal to or less than a current limit Ia and (ii) constant current control to cause the power supply unit to maintain the lamp current at a constant current, the method comprising the steps, performed by the control unit, of until a predetermined time passes after lighting of the high-pressure discharge lamp starts, at least (i) performing constant current control to cause the power supply unit to maintain the lamp current at a predetermined current Ib smaller than the current limit Ia and (ii) performing constant power control to cause the power supply unit to maintain the lamp power at a predetermined wattage $P_{low}$ lower than a rated lamp wattage Pr starting when the lamp power reaches the wattage $P_{low}$; and after the predetermined time passes, performing constant power control to cause the power supply unit to maintain the lamp power at the rated lamp wattage Pr, wherein the current Ib and the wattage $P_{low}$ satisfy the relationships:

$Ia \cdot 0.7 \leq Ib \leq Ia \cdot 0.9$ and $P \cdot 0.5 \leq P_{low} \leq Pr \cdot 0.9$.

Advantageous Effects of Invention

The high-pressure discharge lamp lighting device with the above structure provides a constant current Ib, satisfying the following relationship, to the high-pressure discharge lamp.

$Ia \cdot 0.7 \leq Ib \leq Ia \cdot 0.9$

Since the current Ib is thus set to be between 0.7 and 0.9 times the current limit Ia, the current Ib is smaller than the current Ic (=current limit Ia) in the above conventional lighting device and is larger than the current Id. With this structure, a rise in temperature in the pair of electrodes is moderated more than in the above conventional lighting device, thus reducing damage to the electrodes. Furthermore, in comparison with the lighting device of Patent Literature 1, the buildup of luminous flux in the lamp is accelerated and prevented from becoming delayed.

Before switching to constant power supply at the rated lamp wattage Pr, power of the constant, predetermined wattage $P_{low}$ that is lower than the rated lamp wattage Pr is supplied to the high-pressure discharge lamp, the wattage $P_{low}$ satisfying the following relationship.

$Pr \cdot 0.5 \leq P_{low} \leq Pr \cdot 0.9$

With this structure, before switching to constant power supply at the rated lamp wattage Pr after the predetermined time passes, a rise in temperature in the pair of electrodes is moderated, thus stabilizing the electrodes and preventing the temperature of the electrodes from rising at once during passage of the predetermined time after the start of lighting. As a result, damage to the electrodes is further reduced.

During constant power supply at the rated lamp wattage Pr and the wattage $P_{low}$, the lamp current is controlled to be equal to or less than the current limit Ia, so that even if the lamp voltage becomes too low, the lamp current is prevented from becoming excessively large.

With the above method of lighting a high-pressure discharge lamp, the same advantageous effects as in the above high-pressure discharge lamp lighting device are achieved.

The present invention provides a high-pressure discharge lamp lighting device, a high-pressure discharge lamp device using the same, a projector using the high-pressure discharge lamp device, and a lighting method for a high-pressure discharge lamp that, compared to a conventional structure, reduce damage to the pair of electrodes in the high-pressure discharge lamp while moderating a delay in the buildup of luminous flux in the lamp.

BRIEF DESCRIPTION OF DRAWINGS

FIG. 6 shows the size of a current Ib and a wattage $P_{low}$ in Examples and Comparative Examples used in lighting experiments.

FIG. 7A shows graphs of the relationship between lighting time and lamp voltage and between lighting time and lamp current until luminous flux builds up in the lamp in Example 1, FIG. 7B shows graphs of the relationship between lighting time and lamp voltage and between lighting time and lamp current until luminous flux builds up in the lamp in Example 2, FIG. 7C shows graphs of the relationship between lighting time and lamp voltage and between lighting time and lamp current until luminous flux builds up in the lamp in Example 3, FIG. 7D shows graphs of the relationship between lighting time and lamp voltage and between lighting time and lamp current until luminous flux builds up in the lamp in Example 4, FIG. 7E shows graphs of the relationship between lighting time and lamp voltage and between lighting time and lamp current until luminous flux builds up in the lamp in Example 5, FIG. 7F shows graphs of the relationship between lighting time and lamp voltage and between lighting time and lamp current until luminous flux builds up in the lamp in Comparative Example 1, and FIG. 7G shows graphs of the relationship between lighting time and lamp voltage and between lighting time and lamp current until luminous flux builds up in the lamp in Comparative Example 2.

FIG. 8A shows the change in lamp voltage in the Examples and the Comparative Examples, and FIG. 8B shows the change in the fraction of illumination maintained in the Examples and the Comparative Examples.

DESCRIPTION OF EMBODIMENTS

Embodiments of the present invention are described in detail with reference to the drawings.

Note that in the following Embodiments of the present invention, the character "-" in numerical ranges indicates that the values on either side are included in the range.

Embodiment 1

Overall Configuration

Figure 1:
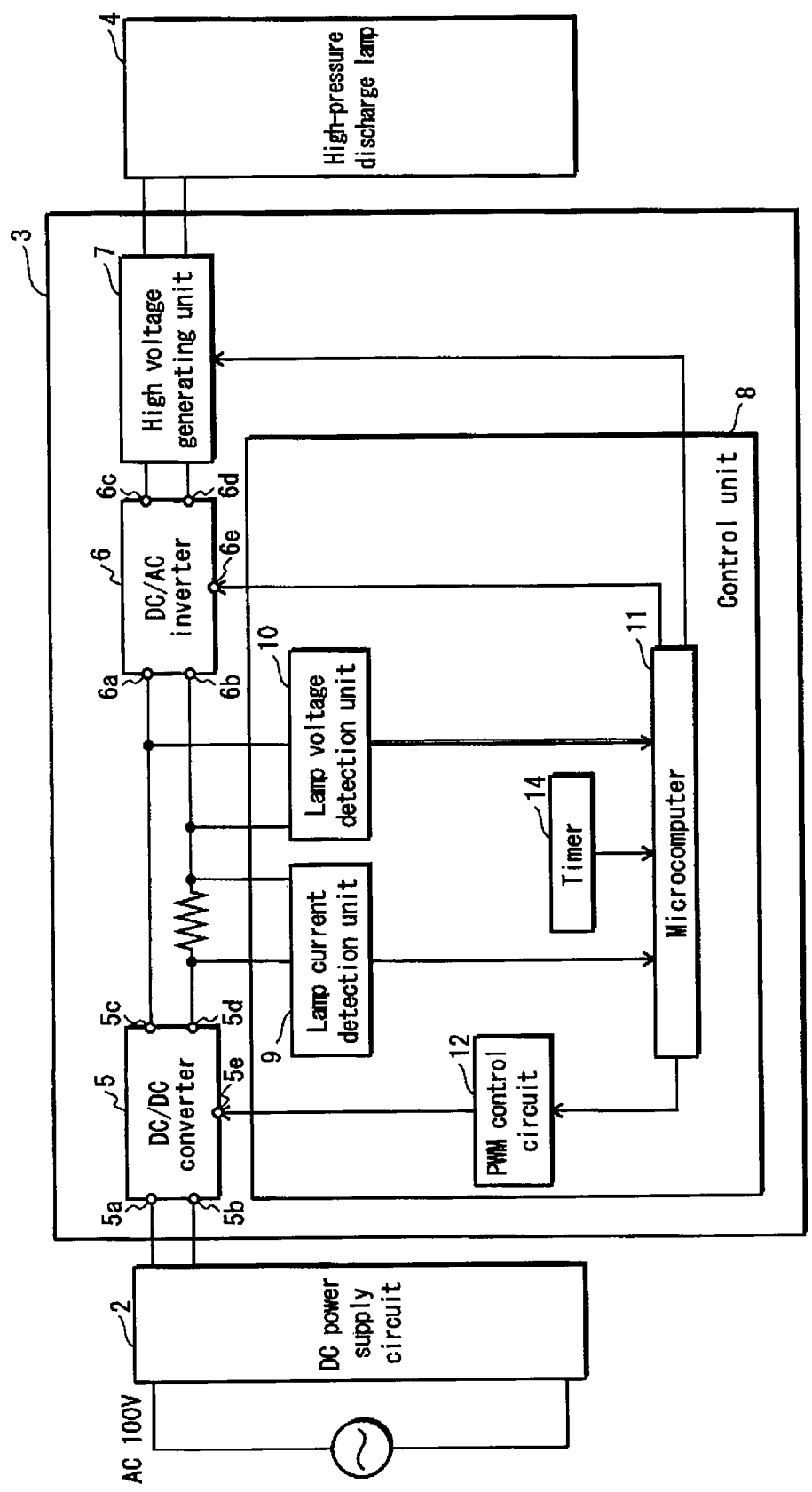
FIG. 1 is a block diagram showing the structure of a high-pressure discharge lamp device according to Embodiment 1.

FIG. 1 is a block diagram of a high-pressure discharge lamp device according to Embodiment 1 of the present invention.

As shown in FIG. 1, the high-pressure discharge lamp device 1 includes a

DC power supply circuit 2 connected to an external AC power supply (AC 100 V), a high-pressure discharge lamp 4 having a rated lamp wattage of 200 W, and a lighting device 3 (electronic ballast) connected between the DC power supply circuit 2 and the high-pressure discharge lamp 4.

The DC power supply circuit 2 has, for example, a rectifying circuit and generates power of a constant DC voltage from household alternating current (100 V), providing the DC voltage to the lighting device 3.

The lighting device 3 converts the DC voltage provided by the DC power supply circuit 2 into AC power and provides the AC power to the high-pressure discharge lamp 4.

The high-pressure discharge lamp 4 is lit by the AC power provided by the lighting device 3.

<Structure of Lighting Device>

The lighting device 3 includes, as main components, a DC/DC converter 5, a DC/AC inverter 6, a high voltage generating unit 7, and a control unit 8. The control unit 8 is provided with a microcomputer 11, a Pulse Width Modulation (PWM) control circuit 12, a lamp current detection unit 9, a lamp voltage detection unit 10, and a timer 14.

The DC/DC converter 5 has input terminals 5a and 5b, output terminals 5c and 5d, and a control terminal 5e. The DC power supply circuit 2 is connected to the input terminals 5a and 5b. The DC/AC inverter 6 is connected to the output terminals 5c and 5d. The PWM control circuit 12 is connected to the control terminal 5e. The DC/DC converter 5 uses PWM control to generate direct current of a size corresponding to a PWM control signal input into the control terminal 5e.

The DC/AC inverter 6 has input terminals 6a and 6b, output terminals 6c and 6d, and a control terminal 6e. The DC/DC converter 5 is connected to the input terminals 6a and 6b. The high-pressure discharge lamp 4 is connected to the output terminals 6c and 6d via the high voltage generating unit 7. The microcomputer 11 is connected to the control terminal 6e. The DC/AC inverter 6 generates an approximately rectangular wave of alternating current at a frequency corresponding to a frequency control signal input into the control terminal 6e. In this way, the direct current output from the DC/DC converter 5 is converted into substantially rectangular wave alternating current. "Substantially rectangular wave" alternating current refers not only to a perfect rectangular wave current, but also includes a rectangular wave that has slight distortion due to factors such as overshooting or undershooting immediately after a polarity reversal. Among lighting methods for suppressing arc jump, it is conventionally known to use alternating wave forms in which (i) a pulse current is superimposed in every rectangular wave half cycle before the polarity reversal, (ii) inclination is given to every rectangular wave half cycle so that current increases with time, or (iii) one cycle of a high frequency wave is added immediately before or after the polarity reversal in every rectangular wave half cycle, and the current supplied only in the latter half cycle of the added wave is set to be higher than the current before the one cycle was added. The "substantially rectangular wave" herein also includes an altered wave, i.e. a standard rectangular wave with certain components superimposed thereon.

The DC/DC converter 5 and the DC/AC inverter 6 with the above structures both convert power at direct-current voltage from the DC power supply circuit 2 to alternating-current power and function as a power supply unit to provide power to the high-pressure discharge lamp 4.

The high voltage generating unit 7 has a transformer, for example, and upon startup of the high-pressure discharge lamp 4 generates high voltage and applies the voltage to the high-pressure discharge lamp 4, causing discharge. After startup, the high-pressure discharge lamp 4 does not require high voltage. Therefore, the transformer is cut off from the power supply path to the high-pressure discharge lamp 4 by a path cutoff switch, for example.

Next, the control unit 8 is described.

The lamp current detection unit 9 detects current (corresponding to lamp current) flowing along the line connecting the DC/DC converter 5 and the DC/AC inverter 6 and outputs a signal indicating the size of the lamp current to the microcomputer 11.

The lamp voltage detection unit 10 detects the output voltage (corresponding to the lamp voltage) of the DC/DC converter 5 and outputs a signal indicating the size of the lamp voltage to the microcomputer 11.

Note that the output voltage includes a voltage drop occurring along the DC/AC inverter 6, the high voltage generating unit 7, circuit wiring, or the like. Accordingly, the output voltage of the DC/DC converter 5 is not strictly equal to the lamp voltage. However, by adjusting for the voltage drop, the output voltage of the DC/DC converter 5 can be treated as the lamp voltage for the purpose of control.

The microcomputer 11 receives the output signals from the lamp current detection unit 9 and the lamp voltage detection unit 10 and outputs, to the PWM control circuit 12, the difference between the lamp current and the current sought by calculation in order for the lamp power to reach a predetermined power, or outputs the difference between the lamp current and a predetermined current, in order for the lamp current to reach the predetermined current. To prevent the lamp current from becoming too high, a current limit Ia is set in the microcomputer 11 to limit the size of the lamp current. The microcomputer 11 inputs a preset frequency limit signal to the DC/AC inverter 6 to limit the frequency of alternating current provided to the high-pressure discharge lamp 4.

Note that in the present invention, the "current limit Ia" is set using the lower limit $V_{low}$ of tolerance and the rated lamp wattage Pr ($Ia=Pr/V_{low}$).

The PWM control circuit 12 generates a PWM control signal composed of duty pulses (ON/OFF switching) based on the differences from the microcomputer 11. The PWM control circuit 12 outputs the generated PWM control signal to the DC/DC converter 5, thereby performing PWM control on the DC/DC converter 5 and controlling the size of the current provided to the high-pressure discharge lamp 4. The timer 14 starts measuring time upon detection of lighting of the lamp. Operations of the control unit 8 are described below.

<Structure of High-Pressure Discharge Lamp>

Next, the structure of the high-pressure discharge lamp 4 is schematically described with reference to FIG. 2.

Figure 2:
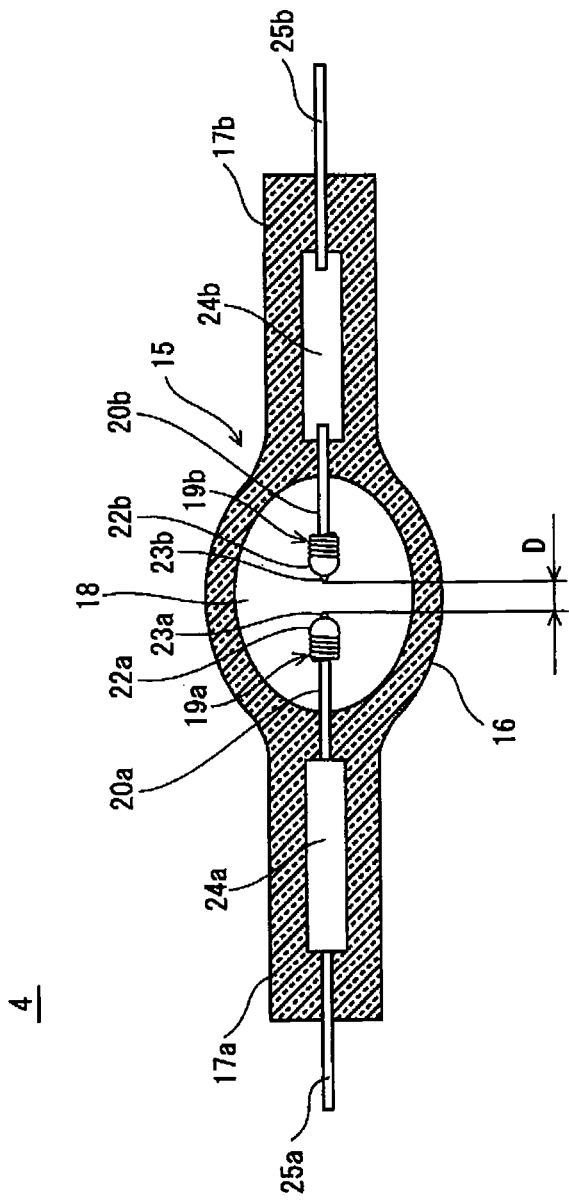
FIG. 2 is a cross-section diagram, including a tube axis, showing the structure of a high-pressure mercury lamp.

As shown in FIG. 2, the high-pressure discharge lamp 4 is, for example, a high-pressure mercury lamp provided with an arc tube 15 that includes a light-emitting part 16 of a substantially spheroidal shape and sealing parts 17a and 17b provided at the ends of the light-emitting part 16. The arc tube 15 is, for example, formed from silica glass. Inside a discharge space 18 in the arc tube 15 are enclosed a predetermined amount of each of the following: a light-emitting material such as mercury (Hg); a noble gas for aiding activation, such as Argon (Ar), Krypton (Kr), Xenon (Xe), or a mixed gas of two or more of these; and a material for a halogen cycle, such as Iodine (I), Bromine (Br), or a compound thereof. For example, the amount of enclosed mercury is set to be in a range of 150 mg/cm$^3$-390 mg/cm$^3$, enclosed Argon (at 25° C.) is set to be in a range of 0.01 MPa-1 MPa, and enclosed Bromide is set to be in a range from $1 \cdot 10^{-10}$ mol/cm$^3$-$1 \cdot 10^{-4}$ mol/cm$^3$, preferably $1 \cdot 10^{-9}$ mol/cm$^3$-$1 \cdot 10^{-5}$ mol/cm$^3$.

Furthermore, inside the discharge space 18, a pair of electrodes 19a and 19b is disposed to be opposite each other on approximately the same axis. The electrodes 19a and 19b are made of tungsten (W) and are electrically connected respectively to external lead wires 25a and 25b via pieces of molybdenum foil 24a and 24b attached hermetically to the sealing parts 17a and 17b.

The electrode 19a has an electrode bar 20a, an electrode coil attached to an end of the electrode bar 20a, and an end portion 22a having a substantially hemispherical shape and formed by fusing a portion of the electrode bar 20a and the electrode coil. Furthermore, a protuberance 23a is formed on the end portion 22a.

The electrode 19b has a similar structure to the electrode 19a, and a protuberance 23b is formed on an end portion 22b thereof. These protuberances 23a and 23b are the arc spots between the electrodes 19a and 19b and are separated by an inter-electrode distance D. The inter-electrode distance D is, for example, set to be in a range of 0.5 mm-2.0 mm.

Rather than being formed by machine processing, the protuberances 23a and 23b self form through lighting experiments at the time of manufacturing due to the halogen cycle, in which tungsten evaporates from the electrodes 19a and 19b while the lamp is lit and then re-deposits on the electrodes 19a and 19b. Note that in FIG. 2, the protuberances formed at the time of manufacturing are shown in the shape thereof upon completion of manufacturing.

The shape of the end portions 22a and 22b in the electrodes 19a and 19b is not limited to being substantially hemispherical, but may for example be substantially spherical or substantially conical. Furthermore, when forming the end portions 22a and 22b of the electrodes 19a and 19b, apart from fusing a portion of each electrode bar with a portion of the respective electrode coil, it is also possible for example to attach, to the end portions of the electrode bars 20a and 20b, portions that have been cut into a substantially hemispherical shape, a substantially spherical shape, or a substantially conical shape, or portions that have been sintered into one of such shapes.

<Structure of Lamp Unit>

Figure 3:
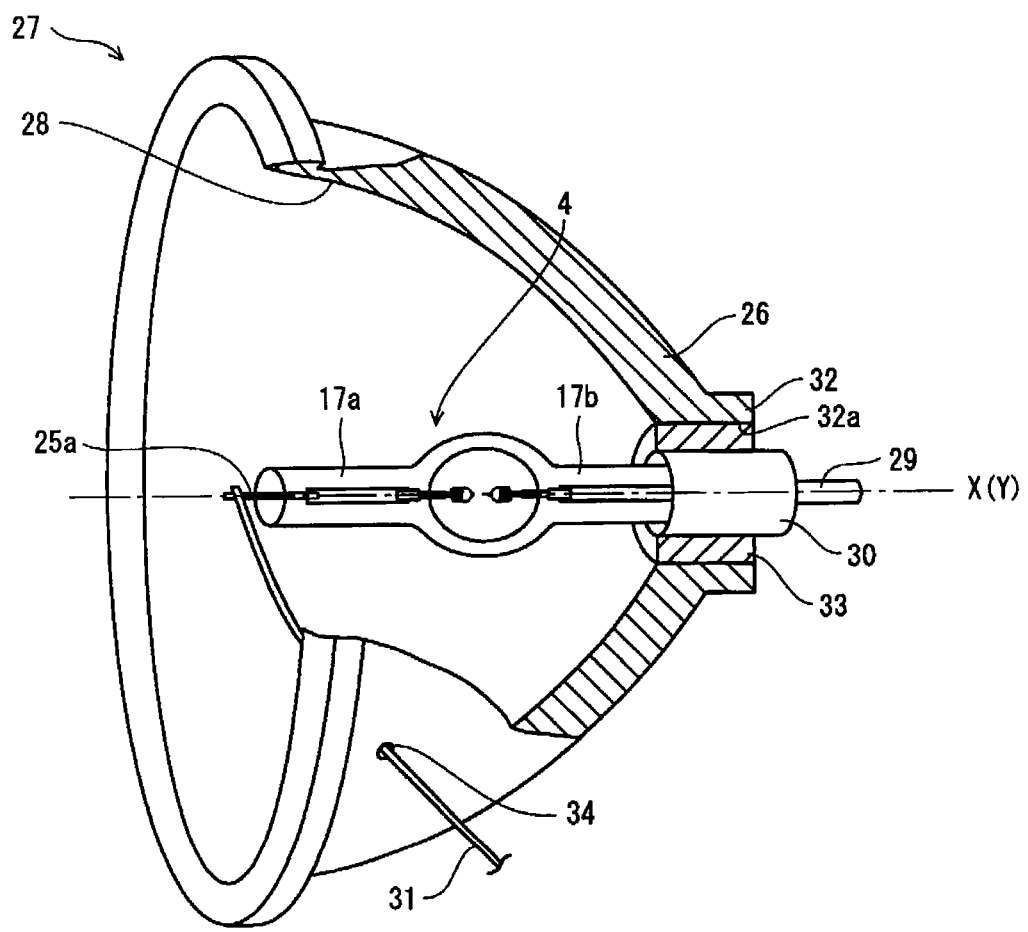
FIG. 3 is a partially cutaway perspective view showing the structure of a lamp unit into which the high-pressure mercury lamp is fitted.

As shown in FIG. 3, such a high-pressure discharge lamp 4 is fitted into a reflective mirror 26 to form a lamp unit 27.

In the lamp unit 27, an inner surface of the reflective mirror 26 forms a concave reflective surface 28. The high-pressure discharge lamp 4 is fit into the reflective mirror 26 so that a longitudinal central axis X of the reflective mirror 26 and an optical axis Y of the reflective mirror 26 are substantially aligned. With this structure, light emitted from the high-pressure discharge lamp 4 reflects off the reflective surface 28, thus improving the collection efficiency of light. The substrate of the reflective mirror 26 is formed from glass or metal, for example. The reflective surface 28 is, for example, a spheroidal surface, a parabolic surface, or a free-form curved surface and is formed by deposition of a multilayer interference film via vapor deposition or sputtering. A neck 32 having a through-hole 32a passing through the bottom of the reflective surface 28 is provided on the reflective mirror 26.

A cylindrically shaped base 30 is attached to one sealing part 17b of the arc tube in the high-pressure discharge lamp 4. The base 30 is provided with a lighting device connection terminal 29. An external lead wire (not shown in the figures), leading to the outside of the sealing part 17b, is connected to the lighting device connection terminal 29. A power supply line 31 for connection with the lighting device is connected to the external lead wire 25a leading out from the other sealing part 17a.

The base 30 of the high-pressure discharge lamp 4 is inserted in the neck 32 of the reflective mirror 26 and fixed thereto by means of an adhesive 33. The power supply line 31 passes through a through-hole 34, provided in the reflective mirror 26, to the outside of the reflective mirror 26.

Note that while the base 30 is provided in the lamp unit shown in FIG. 3, the base 30 need not be provided, and the sealing part 17b of the high-pressure discharge lamp 4 may be fixed to the neck 32 with adhesive.

<Operations of Lighting Device>

Figure 4:
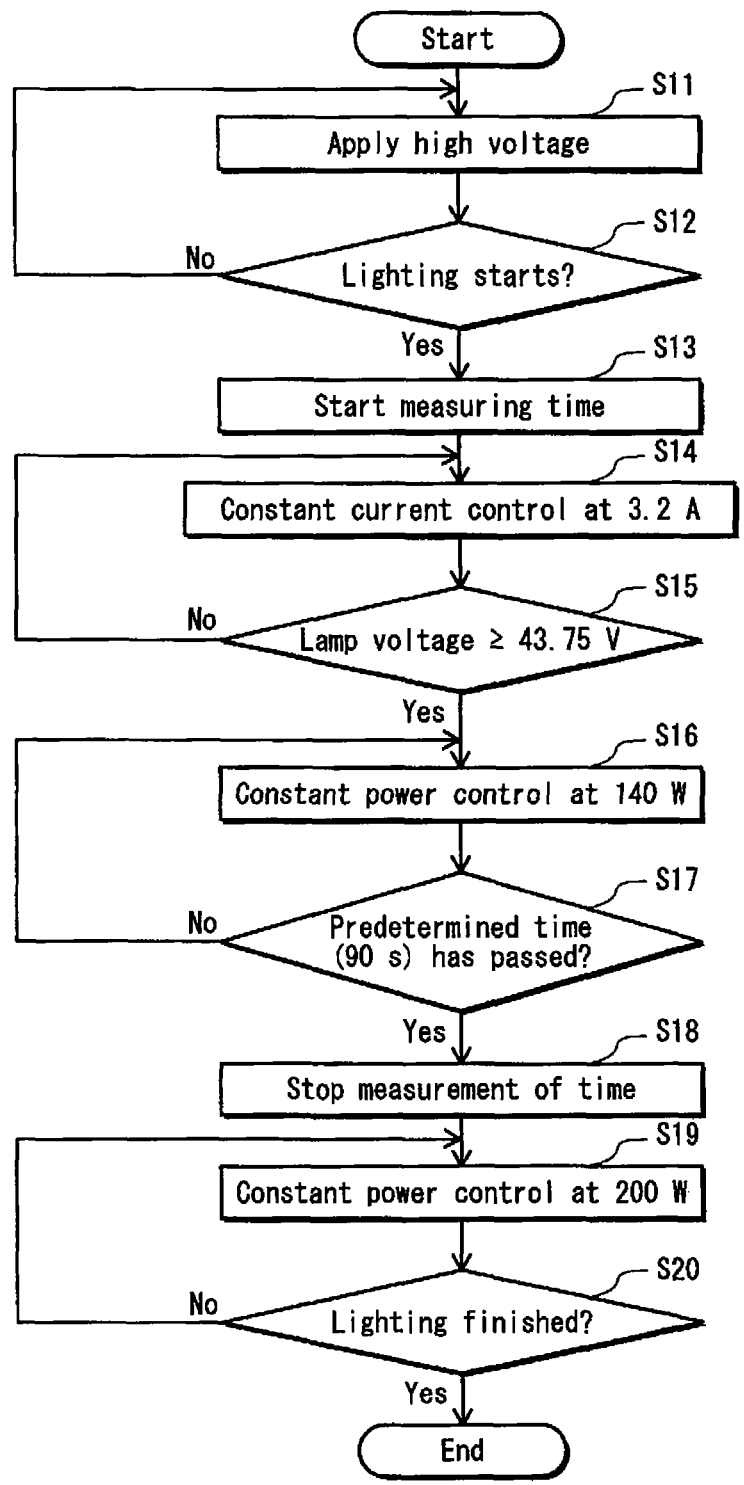
FIG. 4 is a flowchart for explaining the operations of a lighting device.

FIG. 4 is a flowchart showing an example of operations by the lighting device 3 according to the present Embodiment.

As basic information for the present Embodiment, the following are registered in the microcomputer 11: a current limit Ia (4 A), a current Ib (3.2 A), a rated lamp wattage Pr of the high-pressure discharge lamp 4 (200 W), a wattage $P_{low}$, (140 W), a predetermined time (90 s), and a predetermined voltage Vs (43.75 V).

(1) When a lighting switch (not shown in the figures) for causing the high-pressure discharge lamp 4 to start discharging is switched on, the microcomputer 11 causes the high voltage generating unit 7 to generate a high voltage of a high frequency, such as 3 kV at 100 kHz. The high voltage of a high frequency is applied to the high-pressure discharge lamp 4, causing breakdown to occur between the electrodes 19a and 19b and discharge (lighting) to start.

(2) The microcomputer 11 determines whether lighting has started based on a signal output by the lamp current detection unit 9. When determining that lighting has started (S12: YES), the microcomputer 11 causes the timer 14 to start measuring time (S13). When the microcomputer 11 determines that lighting has not started (S12: NO), processing returns to step S11.

(3) Next, the microcomputer 11 performs constant current control via the current Ib (3.2 A), an alternating current with a substantially rectangular wave (S14). Specifically, the microcomputer 11 receives the signal output by the lamp current detection unit 9 and controls the DC/DC converter 5 via the PWM control circuit 12 so that the lamp current becomes the current Ib.

(4) The microcomputer 11 receives a signal output by the lamp voltage detection unit 10 and determines whether the lamp voltage has risen due to the evaporation of mercury and reached the predetermined voltage Vs (43.75 V). If the lamp voltage has not reached the predetermined voltage Vs (S15: NO), the constant current control of S14 is maintained. Note that the predetermined voltage Vs is the voltage when the lamp power reaches the wattage $P_{low}$, described below in S16, during constant current control.

(5) If the lamp voltage has reached the predetermined voltage Vs (S15: YES), control switches to constant power control at the wattage $P_{low}$ (140 W) (S16). Specifically, the microcomputer 11 receives the signal output by the lamp current detection unit 9 and the signal output by the lamp voltage detection unit 10, calculates the current for maintaining the lamp power at the wattage $P_{low}$, and controls the DC/DC converter 5 via the PWM control circuit 12 so that the lamp current becomes the calculated current.

(6) The constant power control of S16 is maintained until the time measured by the timer 14 reaches the predetermined time (90 s) (S17: NO). This predetermined time should be the time necessary for the gas pressure in the lamp to stabilize, thus permitting stable lighting, and may be selected in accordance with lamp specifications or the like. For example, as the time for the gas pressure in the lamp to stabilize, the predetermined time is preferably at least 50 s, and more preferably at least 70 s. Note that from the perspective of buildup of luminous flux in the lamp, it is preferable that the predetermined time be short. Specifically, a time of 180 s or less is preferable, and a time of 120 s or less is more preferable.

(7) When the time measured by the timer 14 reaches the predetermined time (S17: YES), measurement of time stops (S18), and control switches to constant power control at the rated lamp wattage Pr (200 W) (S19). Specifically, the microcomputer 11 receives the signal output by the lamp current detection unit 9 and the signal output by the lamp voltage detection unit 10, calculates the current for maintaining the lamp power at the rated lamp wattage Pr, and controls the DC/DC converter 5 via the PWM control circuit 12 so that the lamp current becomes the calculated current. The constant power control in S19 is maintained until the end of lighting.

During the constant power control in S16 and S19, when the current calculated to maintain the lamp power at each of the constant power levels exceeds the current limit Ia, the microcomputer 11 controls the DC/DC converter 5 via the PWM control circuit 12 so that the lamp current becomes the current limit Ia. In this way, even if the lamp voltage becomes too low, the lamp current is prevented from becoming excessively large.

<Effects of Operation>

Figure 5A:
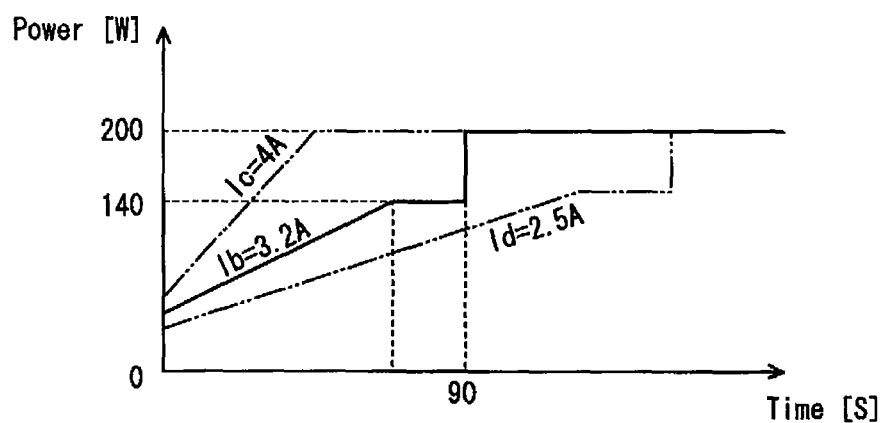
FIGS. 5A, 5B, and 5C are graphs showing the relationship between lighting time and each of lamp power, lamp voltage, and lamp current.
Figure 5B:
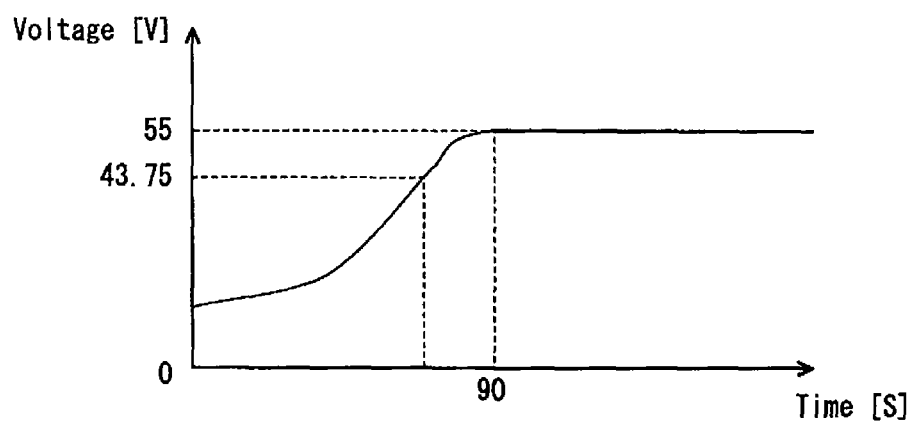
Figure 5C:
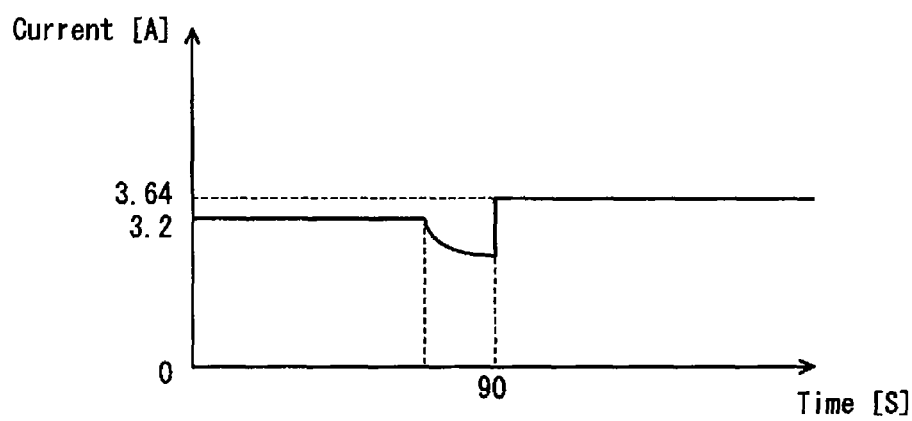

The graphs in FIGS. 5A-5C show the lamp power, lamp voltage, and lamp current over time when a lamp is lit by the above operations.

In these figures, the lamp voltage during stable lighting of the high-pressure discharge lamp 4 is 55 V.

Furthermore, the tolerance of the rated lamp voltage in the high-pressure discharge lamp 4 is 50 V-80 V. FIG. 5A also shows the relationship between lamp power and lighting time as a line with alternate long and two short dashes for lighting of the high-pressure discharge lamp 4 with a conventional lighting device and with the lighting device of Patent Literature 1.

The current Ic during constant current control in the conventional lighting device is 4 A (=current limit Ia). On the other hand, the current Id during constant current control by the lighting device of Patent Literature 1 is set to 2.5 A (=200 W/80 V), which approximately equals the upper limit of the current set in Patent Literature 1.

In this context, the rated lamp voltage is the lamp voltage confirmed upon completion of manufacturing, i.e. the lamp voltage during stable lighting (when the voltage is steady during a stable lighting condition). This rated lamp voltage varies depending on the inter-electrode distance D. Since the inter-electrode distance D is determined by the size of the protuberances 23a and 23b formed on the electrodes 19a and 19b, the rated lamp voltage differs between manufactured articles. To reduce the difference in rated lamp voltage between manufactured articles, it is necessary to observe the condition of the protuberances upon production and to control the shape thereof. This increases the burden of production control and leads to reduced productivity. Therefore, in practice, a range of variation in the rated lamp voltage is specified as acceptable out of consideration for variation during production, and production control is directed towards maintaining the rated lamp voltage of manufactured articles within the specified range. Adoption of such a range moderates the reduction in productivity. This specified range of acceptability is referred to as tolerance. Note that rated lamp voltage and tolerance are typically listed in the specifications or the like included with the lamps upon delivery For 90 s after the start of lighting, the lighting device 3 according to the present Embodiment performs constant current control at the current Ib (3.2 A) until the lamp voltage reaches 43.75 V and performs constant power control at the wattage $P_{low}$ (140 W), which is lower than the rated lamp wattage Pr, once the lamp voltage has reached 43.75 V. By thus controlling the power supplied to the high-pressure discharge lamp 4, after 90 s have passed from the start of lighting, the current when switching to constant power control at the rated lamp wattage Pr is 3.64 A, which is lower than the current limit Ia (4 A), as shown in FIG. 5C. Accordingly, the current when switching to constant power control at the rated lamp wattage Pr is lower than a conventional lighting device. This lowering of the current correspondingly moderates an increase in temperature of the electrodes 19a and 19b in the high-pressure discharge lamp 4 and reduces damage to the electrodes 19a and 19b. This structure therefore increases the lifetime of the lamp.

Providing a period for constant power control at the wattage $P_{low}$ before switching to constant power control at the rated lamp wattage Pr allows the temperature of the electrodes 19a and 19b to stabilize, thus reducing an increase in temperature of the electrodes 19a and 19b upon switching to constant power control at the rated lamp wattage Pr. This reduces damage to the electrodes 19a and 19b upon switching to constant power control at the rated lamp wattage Pr.

Note that since the current Ib is larger than the current Id (2.5 A), the current is larger than in the lighting device of Patent Literature 1, which increases the temperature of the electrodes 19a and 19b and accelerates the rise in lamp voltage. Accordingly, the buildup of luminous flux is accelerated and prevented from becoming delayed. With the present Embodiment, as shown in FIG. 5B, after 90 s have passed since the start of lighting, the lamp voltage has reached 55 V, indicating that luminous flux has built up in the lamp (i.e. that stable lighting has been achieved).

<Setting Range of Current Ib and Wattage $P_{low}$>

In the lighting device 3 according to the present Embodiment, the current Ib is set within the following range.

$$Ia \cdot 0.7 \leq Ib \leq Ia \cdot 0.9$$

Accordingly, the current Ib is within a range of 0.7-0.9 times the current limit Ia. The reason for setting the upper limit as 0.9 times the current limit Ia is that if the current Ib exceeds Ia·0.9, the current Ib no longer differs greatly from the current limit Ia, and the advantageous effect of reducing damage to the electrodes 19a and 19b in the high-pressure discharge lamp 4 is reduced. The reason for setting the lower limit as 0.7 times the current limit Ia is to make the current larger than the current Id, which is 0.625 times the current limit Ia, since the buildup of luminous flux in the lamp is delayed at the current Id.

The wattage $P_{low}$ is set within the following range.

$$Pr \cdot 0.5 \leq P_{low} \leq Pr \cdot 0.9$$

The reason for setting the upper limit as 0.9 times the rated lamp wattage Pr is that if the wattage $P_{low}$ exceeds Pr·0.9, the wattage $P_{low}$ no longer differs greatly from the rated lamp wattage Pr, and the advantageous effect of moderating an increase in temperature of the electrodes 19a and 19b when switching to constant power control at the rated lamp wattage Pr is reduced. The reason for setting the lower limit as 0.5 times the rated lamp wattage Pr is that if the difference between the rated lamp wattage Pr and the wattage $P_{low}$ is too large, the thermal load placed on the electrodes 19a and 19b when switching to constant power control at the rated lamp wattage Pr drastically increases, promoting evaporation of and damage to the electrodes 19a and 19b, the opposite of the desired effect.

The inventors performed the lighting experiments described below and confirmed that if the current Ib and the wattage $P_{low}$ are within the above ranges, damage to the electrodes is reduced as compared to a conventional structure and the lifetime of the lamp increases. The inventors also confirmed that a delay in the buildup of luminous flux in the lamp is moderated.

<Results of Lighting Experiments>

The following describes the results of lighting experiments performed to confirm effects of operation when lighting the lamp with the lighting device 3 according to the present Embodiment.

Five Examples and two Comparative Examples with different values for the current Ib and the wattage $P_{low}$ were prepared for the lighting experiments. Aging to light the high-pressure discharge lamp 4 of the present Embodiment was performed on the Examples and the Comparative Examples, and the lamp voltage and the fraction of illumination maintained were measured. Aging was performed by 300 repetitions of a lighting cycle consisting of lighting the lamp for 3.5 h and turning the lamp off for 0.5 h (total lighting time of 1050 h). During the first lighting cycle immediately after the aging process began, the buildup of luminous flux was confirmed and assessed in the lamps of the Examples and the Comparative Examples.

In each high-pressure discharge lamp 4, the rated lamp wattage Pr was 200 W, and the tolerance of the rated lamp voltage was 50 V-80 V. The lamp voltage during stable lighting of each high-pressure discharge lamp 4 was 55 V at the start of the lighting experiments (total lighting time of 0 h). The current limit Ia in the lighting device 3 used to light the high-pressure discharge lamp 4 was 4 A.

FIG. 6 shows the size of the current Ib and the wattage $P_{low}$, in Examples 1-5 and Comparative Examples 1 and 2. Among the Examples, Example 3 had the current Ib and the wattage $P_{low}$ shown in the flowchart in FIG. 4, i.e. Ib=3.2 A and $P_{low}$=140 W. In Example 1, Ib=3.6 A, and $P_{low}$=180 W. In Example 2, Ib=3.6 A, and $P_{low}$=160 W. In Example 4, Ib=2.8 A, and $P_{low}$=120 W. In Example 5, Ib=2.8 A, and $P_{low}$=100 W.

Comparative Examples 1 and 2 were prepared for comparison with a conventional lighting device and with the lighting device of Patent Literature 1. In a conventional lighting device, the current Ic was 4.0 A (=current limit Ia), and in the lighting device of Patent Literature 1, the current Id was less than 2.5 A (Id<200 W/80 V). Accordingly, Comparative Example 1 was set so that Ib=4.0 A and $P_{low}$="no setting", and Comparative Example 2 was set so that Ib=1.78 A and $P_{low}$=160 W.

(Evaluation of Buildup of Luminous Flux in Lamp)

FIG. 6 shows the results of evaluation of the buildup of luminous flux in the lamps of the Examples and the Comparative Examples. FIGS. 7A-7G are graphs showing the relationship between lighting time and lamp voltage and between lighting time and lamp current until luminous flux builds up in the lamps.

In these figures, a time U for buildup of luminous flux in Comparative Example 2 (see FIG. 7G) was used as a standard to evaluate Examples 1-5 and Comparative Example 1. If luminous flux built up earlier than the time U, the buildup was evaluated as "good", whereas a slower buildup was evaluated as "poor". Note that the buildup in the Comparative Example 2 used as a standard was evaluated as "-".

As shown in FIG. 7G, 90 s after the start of lighting of Comparative Example 2, the lamp voltage was 35 V, a low value. Therefore, after 90 s, it was not possible to switch immediately to constant power control at the rated lamp wattage Pr. Accordingly, after 90 s, constant current control was performed at 4.0 A until the lamp voltage reached 50 V, at which point control switched to constant power control at the rated lamp wattage Pr.

The reason for setting the predetermined time to 90 s is to satisfy user expectations, since if the lamp is used in a compact, portable projector, for example, the user would expect luminous flux to build up in the lamp in a short time, specifically within 90 s.

As shown in FIGS. 7A-7F, in Examples 1-5 and Comparative Example 1, luminous flux in the lamp built up earlier than the time U, since the lamp voltage reached 55 V by 90 s after the start of lighting, or reached 55 V immediately after 90 s had passed. Accordingly, for Examples 1-5 and Comparative Example 1, the buildup was evaluated as "good" in every case.

If the current Ib was 2.8 A or greater, it is therefore clear that luminous flux built up in the lamp faster than with the lighting device of Patent Literature 1.

(Evaluation of Lamp Lifetime and of Reduction of Damage to Electrodes)

Next, the result of aging performed on the Examples and the Comparative Examples is described.

FIG. 8A shows the change in lamp voltage in the Examples and the Comparative Examples.

As shown in FIG. 8A, the lamp voltage after a cumulative lighting duration of 1050 h was less than 80 V in Examples 1-5, whereas the lamp voltage exceeded 80 V in Comparative Examples 1 and 2. First, in Comparative Example 1, it is considered that the lamp voltage increased because the current Ib was larger than in Examples 1-5, causing the temperature of the electrodes 19a and 19b in the high-pressure discharge lamp 4 to increase and thereby damaging the electrodes 19a and 19b and increasing the inter-electrode distance D. Next, in Comparative Example 2, while the current Ib of 1.78 A was smaller than Examples 1-5, it is considered that the lamp voltage increased because constant current control was performed at 4.0 A after 90 s, causing the temperature of the electrodes 19a and 19b to increase during this time and worsening damage. Therefore, in Examples 1-5, it is clear that damage to the electrodes 19a and 19b was reduced as compared to Comparative Examples 1 and 2.

Furthermore, among Examples 1-5, the lamp voltage was the lowest in Example 3, at 60 V, thus achieving the most reduction of damage to the electrodes 19a and 19b.

The reason why the lamp voltage was higher in Examples 1 and 2 than in Example 3 is that the current Ib was larger than in Example 3, correspondingly causing more damage to the electrodes 19a and 19b. Even though the current Ib was smaller in Examples 4 and 5 than in Example 3, the lamp voltage was higher because, as shown in FIGS. 7D and 7E, the lamp voltage was less than 55 V after 90 s, and therefore when switching to constant power control at the rated lamp wattage Pr, a larger current than in Example 3 (3.64 A) was temporarily provided (3.77 A and 3.84 A respectively).

Furthermore, when comparing Examples 1 and 2, which had the same current Ib, the lamp voltage was higher in Example 1, which had a larger wattage $P_{low}$. This is considered to be because the wattage $P_{low}$, in Example 1, 180 W, was near the rated lamp wattage Pr, and therefore when switching to constant power control at the rated lamp wattage Pr, the temperature of the electrodes 19a and 19b was already high, and therefore when taking constant power control at the wattage $P_{low}$ into consideration, the effect of reducing damage to the electrodes 19a and 19b was achieved to a lesser degree. Furthermore, when comparing Examples 4 and 5, which had the same current Ib, the lamp voltage was higher in Example 5, which had a smaller wattage $P_{low}$. This is considered to be because the large current temporarily supplied when switching to constant power control at the rated lamp wattage Pr was larger in Example 5. Another reason is considered to be the large difference between the wattage $P_{low}$ of 100 W in Example 5 and the rated lamp wattage Pr, which dramatically increased the thermal load placed on the electrodes 19a and 19b when switching to constant power control at the rated lamp wattage Pr, promoting evaporation of the electrodes 19a and 19b.

FIG. 8B shows the change in the fraction of illumination maintained in the Examples and the Comparative Examples.

The illumination of each high-pressure discharge lamp 4 at the start of the aging process (cumulative lighting duration 0 h) was set as a standard (100%) against which the fraction of illumination maintained was measured at the end of the aging process (cumulative lighting duration 1050 h).

Figure 9:
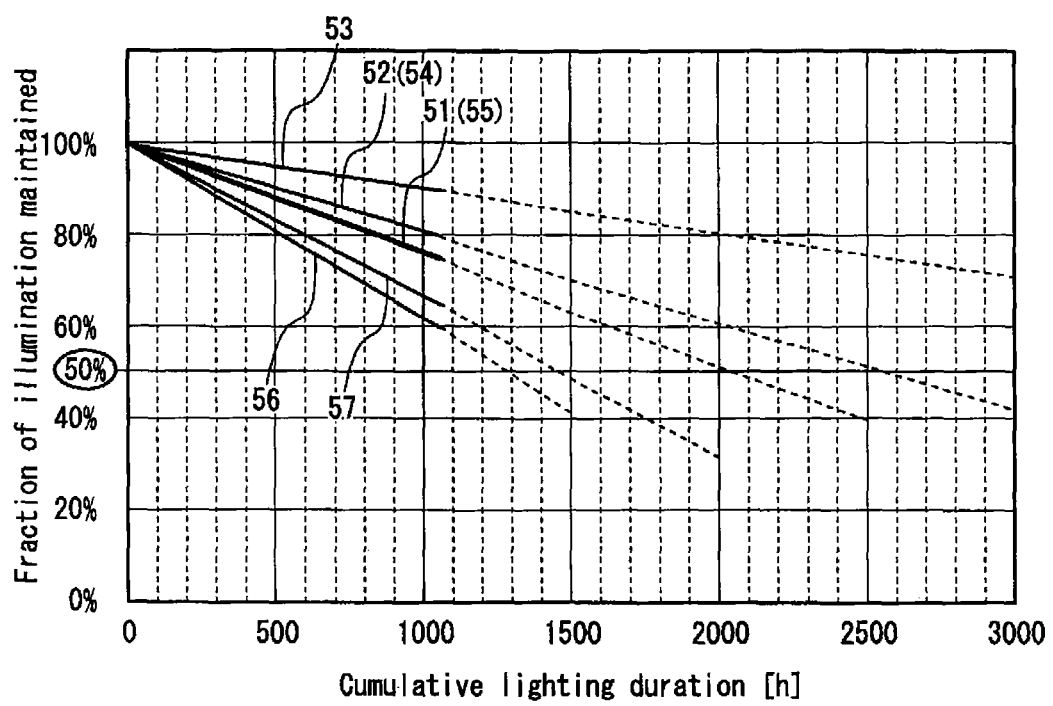
FIG. 9 illustrates the relationship between the fraction of illumination maintained and cumulative lighting duration.

FIG. 9 is a plot of the fraction of illumination maintained in FIG. 8B, showing the cumulative lighting duration (h) along the horizontal axis and the fraction of illumination maintained (%) along the vertical axis.

In FIG. 9, the changes in Examples 1-5 and Comparative Examples 1 and 2 are shown by lines 51-57. Starting with the line showing the least decrease in the fraction of illumination maintained, line 53 shows Example 3, line 52 (line 54) shows Example 2 (Example 4), line 51 (line 55) shows Example 1 (Example 5), line 57 shows Comparative Example 2, and line 56 shows Comparative Example 1. Furthermore, based on the change in the fraction of illumination maintained until the cumulative lighting duration of 1050 h, FIG. 9 shows the predicted change in the fraction of illumination maintained after the cumulative lighting duration 1050 h as a dashed line.

FIG. 8B lists predicted values for lamp lifetime determined based on the predicted change in the fraction of illumination maintained in FIG. 9.

In FIG. 8B, a value of 50% as the fraction of illumination maintained was used as the standard for determining lamp lifetime.

A predicted value for lamp lifetime of 2000 h or greater was evaluated as "good", and a predicted value of 4000 h or greater was evaluated as "excellent". On the other hand, a predicted value for lamp lifetime of less than 2000 h was evaluated as "poor".

In FIG. 9, the (predicted) change in the fraction of illumination maintained for Example 3 is shown to 70%. Calculation yields a predicted lamp lifetime of 5000 h for Example 3. Therefore, in FIG. 8B, the lifetime for Example 3 was evaluated as "excellent".

As a result, since the lamp lifetime was 2000 h or greater for Examples 1-5, the lifetime was evaluated as "good" or "excellent" in every case. Conversely, since the lamp lifetime was less than 2000 h for Comparative Examples 1 and 2, the lifetime was evaluated as "poor" in both cases.

As the above results show, damage to the electrodes 19a and 19b is reduced in Examples 1-5 more than in Comparative Examples 1 and 2, thus improving the lamp lifetime.

Figure 10:
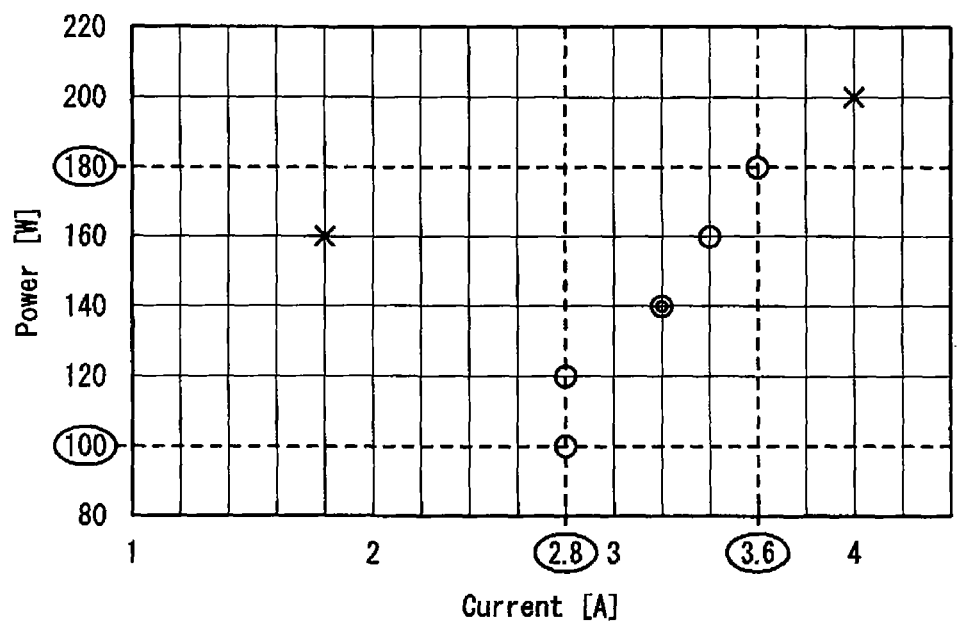
FIG. 10 illustrates the relationship between the current Ib and the wattage $P_{low}$.

FIG. 10 is a plot of the current Ib and the wattage $P_{low}$, in Examples 1-5 and Comparative Examples 1 and 2, with current (A) on the horizontal axis and power (W) on the vertical axis. [0088]

As shown in FIG. 10, the current Ib in Examples 1-5 is in a range of 2.8 A-3.6 A, and the wattage $P_{low}$ is in a range of 100 W-180 W.

The current Ib is represented in terms of the current limit Ia (4 A) by the following expressions.

$$Ia \cdot 0.7 \leq Ib \leq Ia \cdot 0.9$$

The wattage $P_{low}$ is represented in terms of the rated lamp wattage Pr (200 W) by the following expressions.

$$Pr \cdot 0.5 \leq P_{low} \leq Pr \cdot 0.9$$

Accordingly, as long as the current Ib and the wattage $P_{low}$ are within the above ranges, the advantageous effect of reducing damage to the pair of electrodes more than in a conventional structure is achieved, thus extending lamp lifetime. The advantageous effect of moderating a delay in the buildup of luminous flux in the lamp is also achieved.

Embodiment 2

Figure 11:
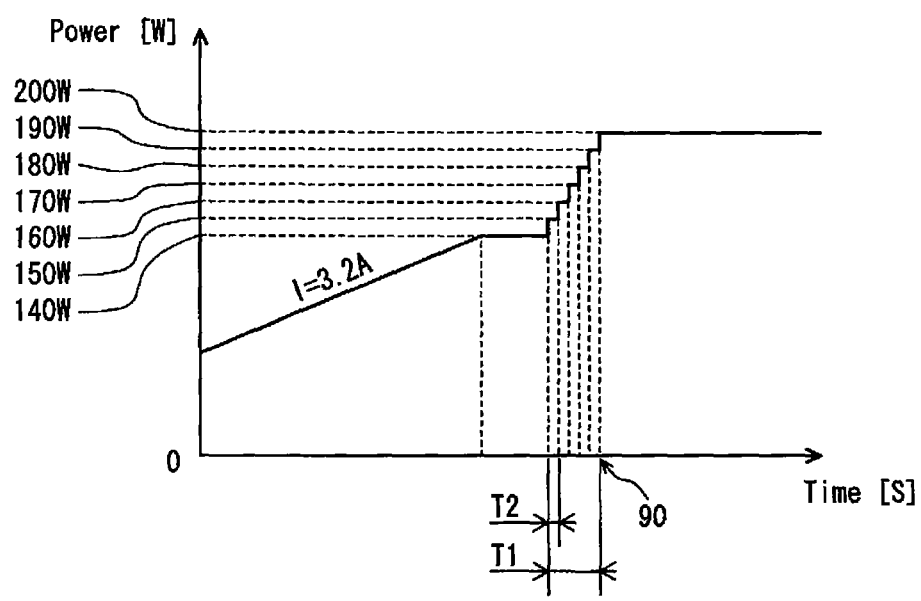
FIG. 11 is a graph showing the relationships between lighting duration and lamp powers during lighting with the lighting device according to Embodiment 2.

FIG. 11 shows the relationships between lighting duration and lamp powers when the high-pressure discharge lamp 4 is lit with the lighting device 3 according to Embodiment 2.

As shown in FIG. 11, the lighting device 3 according to Embodiment 2 is the same as the lighting device 3 according to Embodiment 1 with respect to performing constant current control at the current Ib (3.2 A) and performing constant power control at the wattage $P_{low}$ (140 W) and at the rated lamp wattage Pr (200 W) (see FIGS. 5A-5C). On the other hand, whereas in the lighting device 3 according to Embodiment 1, the lamp power rises at once from the wattage $P_{low}$ to the rated lamp wattage Pr, the lighting device 3 according to Embodiment 2 differs in that the lamp power rises to the rated lamp wattage Pr stepwise. Specifically, the lamp power is raised from 140 W to 200 W in six steps. In this example, the lamp power passes through the steps of 150 W, 160 W, 170 W, 180 W, and 190 W before reaching 200 W.

By thus raising the lamp power stepwise, the temperature of the electrodes 19a and 19b in the high-pressure discharge lamp 4 is raised stepwise. As compared to when the lamp power is increased at once, such a stepwise increase moderates a rise in temperature in the electrodes 19a and 19b due to the rise in lamp power. Furthermore, the illumination of the lamp is prevented from drastically changing, which has the advantage that when the high-pressure discharge lamp 4 is used in a projector, for example, the change in illumination at startup becomes gradual. Note that the structure of the lighting device 3 and the high-pressure discharge lamp 4 are the same as Embodiment 1, and for the sake of simplicity a description thereof is omitted.

Next, an example of operations of the lighting device 3 for raising the lamp power stepwise is described.

Only operations that differ from Embodiment 1 are described, a description of other operations being omitted. In the present Embodiment, the operation to raise the lamp power stepwise is performed from the end of constant power control at the wattage $P_{low}$ until the predetermined time (in this Embodiment, 90 s) passes after the start of lighting. In terms of FIG. 4 for Embodiment 1, this operation is performed after S16 and before S17.

In addition to the basic information in Embodiment 1, five wattages (=150 V, 160 W, 170 W, 180 W, and 190 W) are further registered in the microcomputer 11 as target values for the lamp power. The microcomputer 11 functions as a memory unit registering the target values for the lamp power.

(1) During constant power control at the wattage $P_{low}$ (140 W), if the lamp current reaches a predetermined current (for example, 50 V), the microcomputer 11 calculates, using time measurement by the timer 14, a time T1 remaining until the predetermined time from the start of lighting (90 s) passes and further calculates a time interval T2 (=T1/5) from the calculated time T1. This time interval T2 is the time interval for switching the lamp power successively between the above five wattages.

(2) The microcomputer 11 first sets the target value for the lamp power to 150 W and controls power at the set target value of 150 W. Specifically, the microcomputer 11 receives the signal output by the lamp current detection unit 9 and the signal output by the lamp voltage detection unit 10, calculates the current for maintaining the lamp power at 150 W, and controls the DC/DC converter 5 via the PWM control circuit 12 so that the lamp current becomes the calculated current.

(3) Subsequently, each time the time interval T2 passes, the microcomputer 11 switches to the next target value for the lamp power successively through the values of 160 W, 170 W, 180 W, and 190 W and performs power control at each new target value. In this way, the microcomputer 11 functions as a power switching unit to successively switch the lamp power.

(4) After 90 s passes as measured by the timer 14, the microcomputer 11 switches to constant power control at the rated lamp wattage Pr. Subsequent operations are the same as in Embodiment 1.

In the present Embodiment, the lamp power is raised stepwise from the wattage $P_{low}$ to the rated lamp wattage Pr in six steps, but the present invention is not limited in this way. A structure with five or fewer steps, or with seven steps of more, may be adopted. For example, in the case of a lamp used in a projector, a larger number of steps to raise the lamp power from the wattage $P_{low}$ to the rated lamp wattage Pr makes the change in illumination of the lamp more gradual, and therefore 20 steps is more preferable than 10, and 30 steps is more preferable than 20. The number of steps for raising the lamp power from the wattage $P_{low}$ to the rated lamp wattage Pr may be determined appropriately in accordance with lamp specifications.

<Projector>

Next, a projector according to Embodiment 3 is described with reference to FIGS. 12 and 13.

Figure 12:
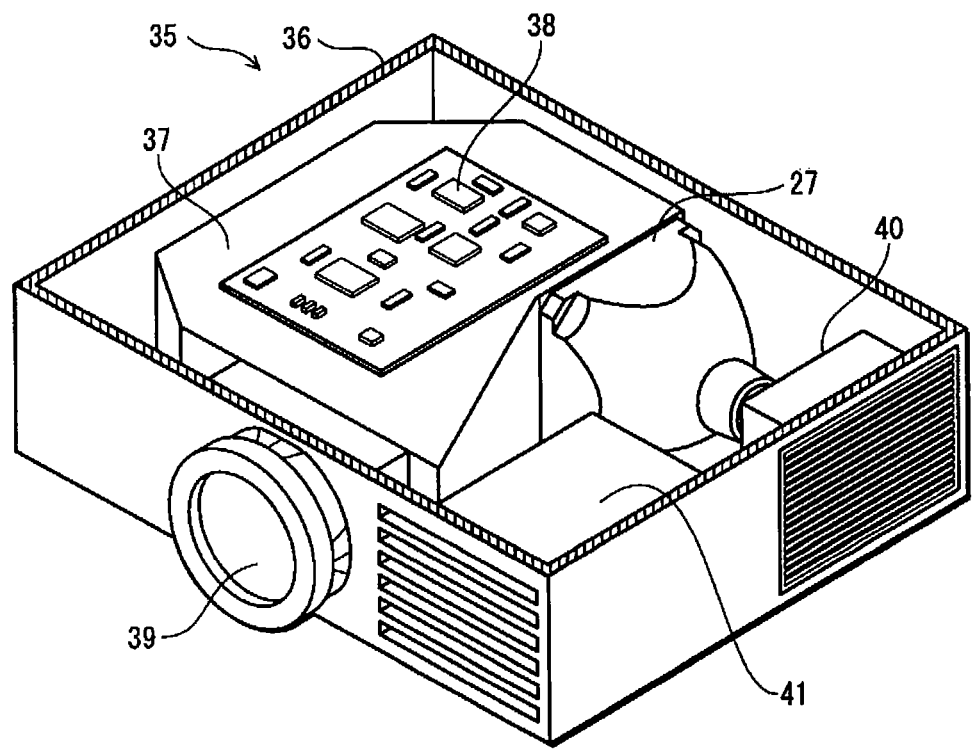
FIG. 12 is a partially cutaway perspective view showing the structure of a projector according to Embodiment 3.

FIG. 12 is a perspective view schematically showing the structure of a front projector 35. The front projector 35 projects images towards a screen (not shown in the figures) placed in front of the front projector 35 and is provided with a lamp unit 27 that includes the high-pressure discharge lamp 4 of one of the above Embodiments as a light source.

As shown in FIG. 12, the front projector 35 is further provided with an optical unit 37, a control unit 38, a projection lens 39, a cooling fan unit 40, a power unit 41, and the like housed in a case 36. The power unit 41 includes the lighting device 3 and converts power provided from a commercial power supply into power appropriate for the control unit 38 and the lamp unit 27, providing the converted power thereto. Therefore, by lighting the high-pressure discharge lamp 4 with the flighting device 3, damage to the electrodes 19a and 19b in the high-pressure discharge lamp 4 is reduced, and the lifetime of the lamp is extended, thus reducing the burden of maintenance for the front projector 35.

Note that in FIG. 12, in order to clearly show the structure of the front projector 35, the case 36 is shown with a top plate thereof removed.

Figure 13:
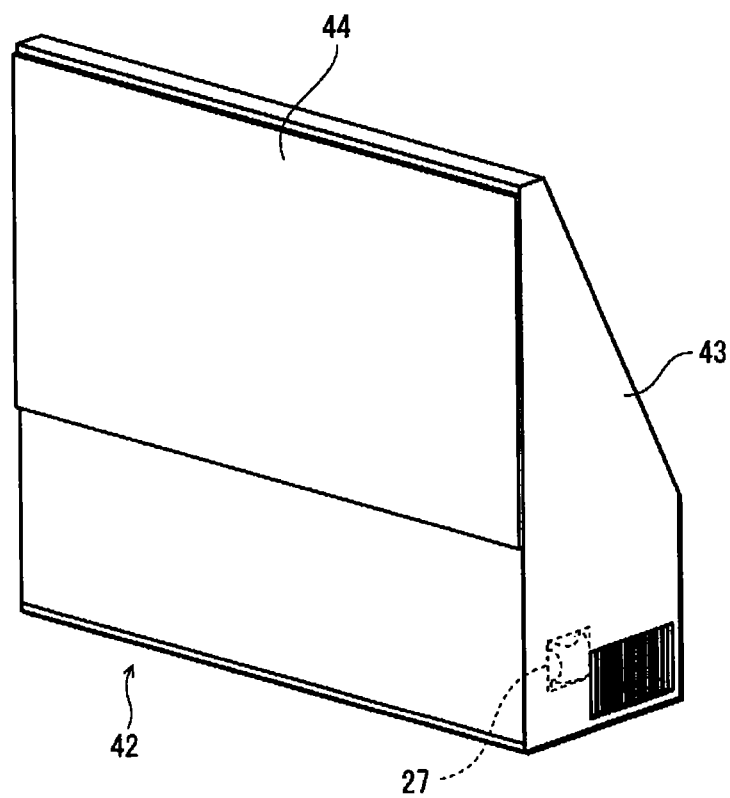
FIG. 13 is a perspective view showing the structure of a rear projector according to Embodiment 3.
Figure 14A:
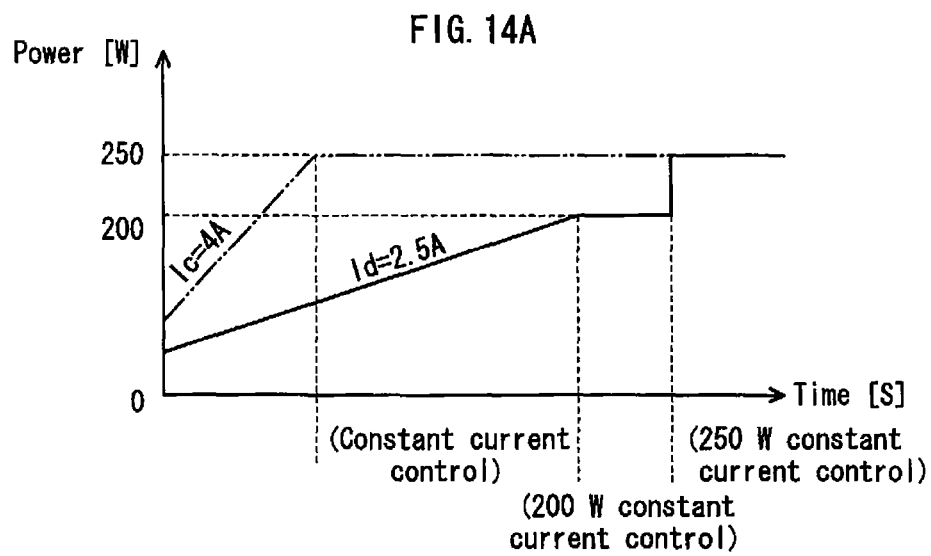
FIG. 14A is a graph showing the relationship between lighting duration and lamp power for lighting with a conventional lighting device.
Figure 14B:
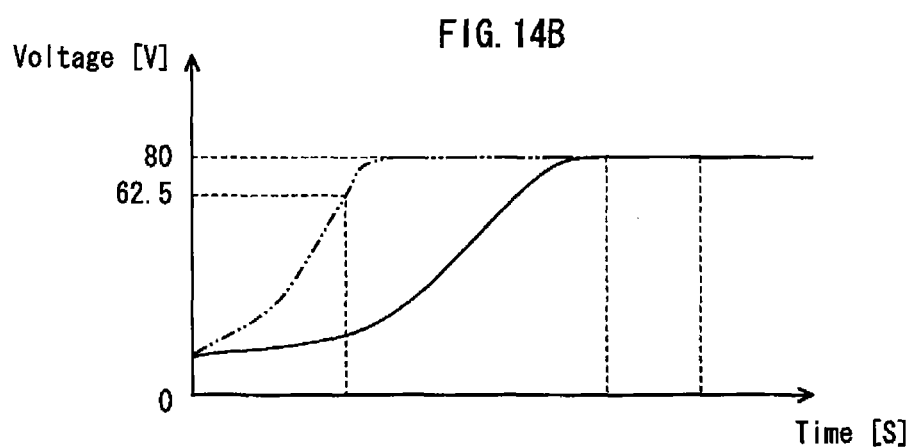
FIG. 14B is a graph showing the relationship between lighting duration and lamp voltage for lighting with a conventional lighting device.
Figure 14C:
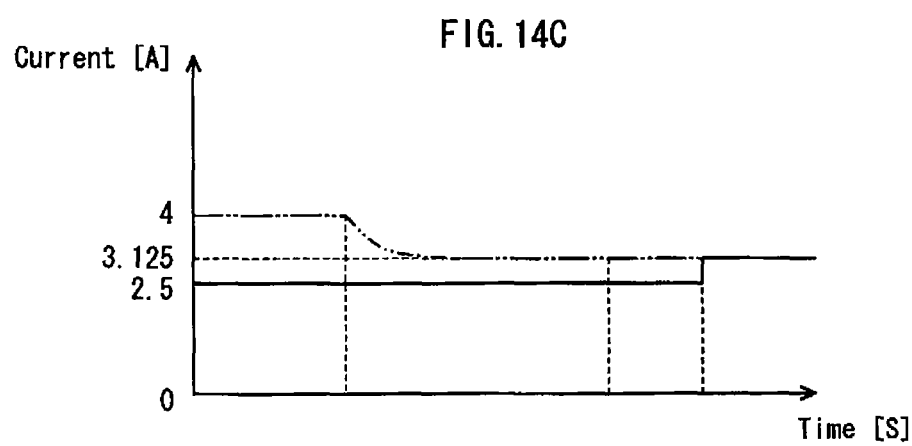
FIG. 14C is a graph showing the relationship between lighting duration and lamp current for lighting with a conventional lighting device.

FIG. 13 is a perspective view schematically showing the structure of a rear projector 42.

The rear projector 42 includes a lamp unit 27, an optical unit, a projection lens, a mirror, a lighting device 3 for providing power to a high-pressure discharge lamp (all not shown in the figures), and the like contained in a case 43. An image projected by the projection lens and reflected off the mirror is projected from behind a transparent screen 44, thereby displaying the image. In the rear projector 42 as well, by lighting the high-pressure discharge lamp 4 with the lighting device 3, damage to the electrodes 19a and 19b in the high-pressure discharge lamp 4 is reduced, and the lifetime of the lamp is extended, thus reducing the burden of maintenance for the rear projector 42.

The lighting device for a high-pressure discharge lamp, high-pressure discharge lamp device using the same, projector using the high-pressure discharge lamp device, and lighting method for high-pressure discharge lamp have been described based on Embodiments thereof. However, the present invention is not limited to these Embodiments. For example, the following Modifications are possible.

<Modifications>

(1) In the above Embodiments, after the start of lighting, constant current control at the current Ib is immediately performed. However, before performing constant current control at the current Ib, a warm-up period for stabilizing discharge may be provided. Specifically, as the warm-up period, constant current control may be performed for 2 s at a high frequency current selected from a range of 1 kHz-500 kHz in order to stabilize discharge. Note that during the warm-up period, instead of constant current control at the high frequency current, a known direct current operation, or constant current control at a low frequency current of less than 1 kHz, may be performed.

(2) Before constant current control at the current Ib, constant current control at a current larger than the current Ib may be performed. In particular, if the lamp voltage is less than 27 V, the electrodes 19a and 19b in the high-pressure discharge lamp 4 are at a low temperature, and therefore the electrodes 19a and 19b are not prone to damage even at a large current. Increasing the current has the advantage of accelerating buildup of luminous flux in the lamp.

(3) In the above Embodiments, in order to start discharge in the high-pressure discharge lamp 4, high voltage at a high frequency has been described as being output by the high voltage generating unit 7, but the present invention is not limited in this way. A known intermittent oscillating high-voltage pulse may be adopted.

(4) In the above Embodiments, the timing for switching to constant power control at the wattage $P_{low}$, is determined based on whether the lamp voltage has reached 43.75 V, but this determination may instead be made based on whether the lamp power has reached 140 W.

(5) In the above Embodiments, the case of using a high-pressure mercury lamp with a rated lamp wattage of 200 W as the high-pressure discharge lamp 4 has been described, but the present invention is not limited in this way. The same advantageous effects as described above are achieved when using a high-pressure mercury lamp having a rated lamp wattage in a range of 80 W-1000 W.

(6) In the above Embodiments, the case of using a high-pressure mercury lamp as the high-pressure discharge lamp 4 has been described, but the present invention is not limited in this way. The same advantageous effects as described above are achieved when using a known short-arc metal halide lamp or the like.

INDUSTRIAL APPLICABILITY

The present invention can be widely used in high-pressure discharge lamp devices, in projectors that have a high-pressure discharge lamp device, and in the like.

REFERENCE SIGNS LIST 1 high-pressure discharge lamp device
2 DC power supply circuit
3 lighting device
4 high-pressure discharge lamp
5 DC/DC converter
6 DC/AC inverter
7 high voltage generating unit
8 control unit
9 lamp current detection unit
10 lamp voltage detection unit
11 microcomputer
12 PWM control circuit
14 timer
15 arc tube
16 light-emitting part
19a, 19b electrode
23a, 23b protuberance
26 reflecting mirror
35 front projector
42 rear projector

The invention claimed is:

1. A method for lighting a high-pressure discharge lamp having an arc tube enclosing a light-emitting material and a pair of electrodes disposed opposite each other, the method being used in a lighting device provided with a power supply unit operable to supply power to the high-pressure discharge lamp and a control unit operably configured to control the power supply unit by selectively performing (i) constant power control to cause the power supply unit to maintain lamp power at a constant power at which lamp current is equal to or less than a current limit (Ia) and (ii) constant current control to cause the power supply unit to maintain the lamp current at a constant current, the method comprising the steps, performed by the control unit, of until the lamp power reaches a predetermined wattage ($P_{low}$), performing constant current control to cause the power supply unit to maintain the lamp current at a predetermined current (Ib) smaller than the current limit (Ia), such that the current (Ib) satisfies the relationship Ia·0.7≤Ib≤Ia·0.9 and when an upper limit of tolerance in a rated lamp voltage is set in the high-pressure discharge lamp as ($V_{high}$) and a rated wattage of the high-pressure discharge lamp is set as (Pr), the current (Ib) satisfies the relationship Ib>Pr/$V_{high}$;

until a predetermined time passes, performing constant power control to cause the power supply unit to maintain the lamp power at a predetermined wattage ($P_{low}$) lower than the wattage (Pr) starting when the lamp power reaches the wattage ($P_{low}$) during the constant current control, such that $P_{low}$ satisfies the relationship Pr·0.5≤$P_{low}$≤Pr·0.9, wherein Pr is the rated lamp wattage; and after the predetermined time passes, performing constant power control to cause the power supply unit to maintain the lamp power at wattage (Pr).

2. The method for lighting a high-pressure discharge lamp of claim 1 wherein the predetermined current (Ib) is maintained immediately after starting the constant current control until the lamp power reaches predetermined wattage ($P_{low}$).

3. The method for lighting a high-pressure discharge lamp of claim 2 wherein the power supply unit applies a high-frequency current from 1 kHz to 500 kHz from a start of an initial lighting until the predetermined time period passes.

* * * * *